Aug. 11, 1959 D. H. PARIS 2,899,001
LAWN EDGER
Filed Sept. 9, 1958 2 Sheets-Sheet 1
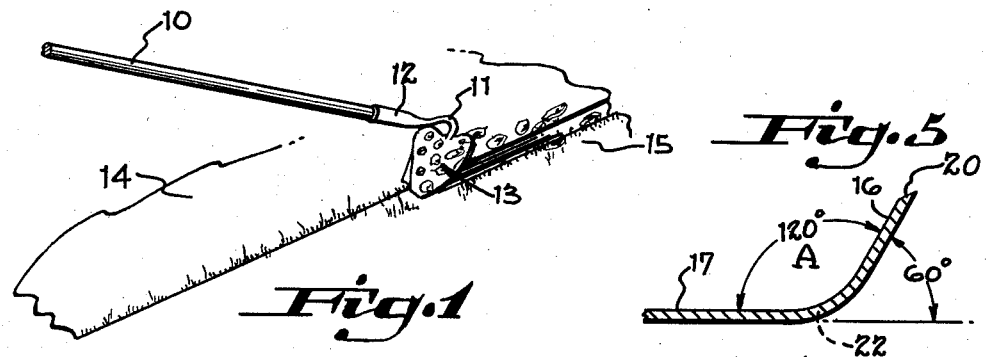
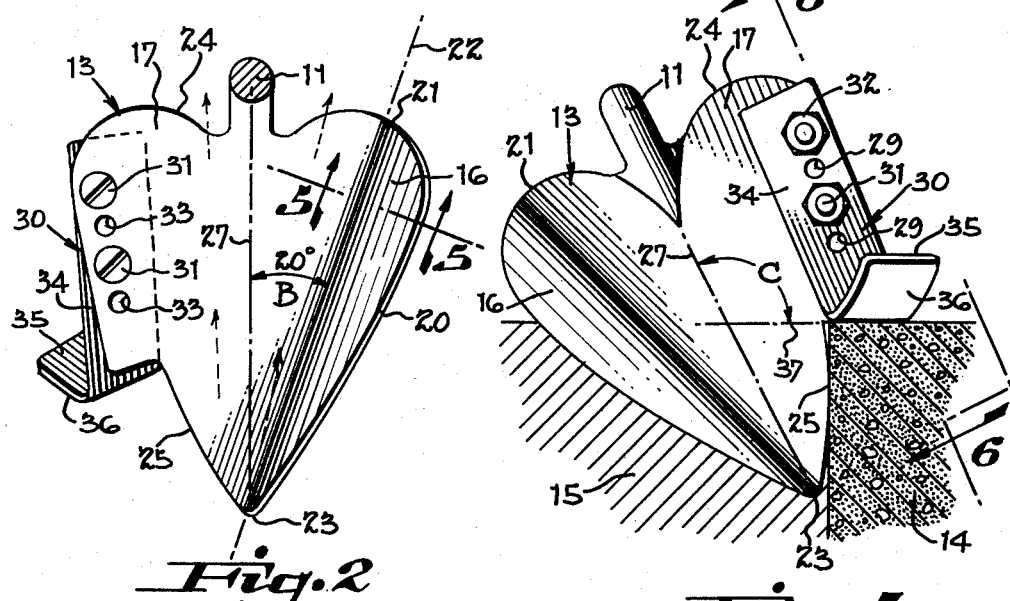
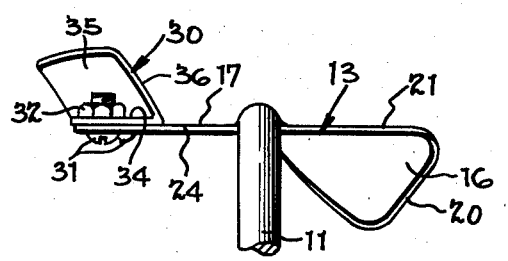
INVENTOR.
Dave H. Paris.
BY
Wood, Herron & Evans.
ATTORNEYS.

Aug. 11, 1959  D. H. PARIS  2,899,001
LAWN EDGER

Filed Sept. 9, 1958  2 Sheets-Sheet 2

INVENTOR.
Dave H. Paris.
BY
Wood, Herron & Evans.
ATTORNEYS.

United States Patent Office 2,899,001
Patented Aug. 11, 1959

2,899,001

LAWN EDGER

Dave H. Paris, Cincinnati, Ohio

Application September 9, 1958, Serial No. 759,888

3 Claims. (Cl. 172—13)

This invention relates to a lawn edger, and particularly to a lawn edger having a pull handle and a blade mounted on one end of the handle.

A considerable number of lawn edgers have been designed in the past and a number of them have been reduced to practice and an occasional one marketed with some degree of success. There are, however, limitations inherent in the prior art designs which render such designs not completely successful for one reason or another. Certain designs, for example, are relatively complex mechanisms including rotary parts which are complicated, expensive to manufacture, and the best of them are suitable for only certain types of soil conditions.

Other simpler types of prior edger designs are disadvantageous principally from the standpoint of their performance characteristics in that they do not properly cut through and remove the soil, grass and root structure in all types of lawns and soil conditions.

The lawn edger of the present invention eliminates the disadvantages of prior designs by providing a simple, unitary edger construction configurated with optimum angular relationships of the blade surfaces to each other whereby maximum efficiency of turf cutting and removal is effected.

It has been still another objective of the invention to provide a generally triangularly shaped lawn edger blade mounted on the end of the handle, the blade having a cutting edge disposed at an optimum angle for slicing through soil, grass and root structure, and a guide portion for removing the cut earth and grass and casting a furrow along over the top of the blade. The angle of the cutting edge is related to the guide portion surface, the complete blade angularly related to the pull handle, and the complete instrument angularly related to the grass and walkway by a guide shoe to effect the slicing of a groove in the soil while reducing to a minimum the tendency of the implement to compact the soil and thereby to impede the movement of the edger through the soil. Through the design according to this objective, the principle force required to be applied to the handle of the edger is that necessary only to pull the cutting edge as it slices through the turf.

It has been still another objective of the invention to provide a lawn edger having a generally vertically adjustable guide shoe, the guide shoe having a lower surface which determines, when applied flat on a walkway, the optimum angle of the edger handle in a vertical plane, horizontal plane and rotatively about the axis of the handle.

It has been still another objective of the invention to provide a lawn edger having a generally vertically adjustable guide shoe which not only determines the angle of engagement of the edge with the lawn, but which can be adjusted to various depths in order to accommodate the edger to different lawns and walkways relationships.

It has been still another objective of the invention to provide a lawn edger which is easy to handle and which can be operated by anyone with or without the help of simple directions.

It has been another objective of the invention to provide a lawn edger which is not only suitable for use in all types of soils, but is useful under all weather conditions for all types of soils and is particularly suitable for edging a sodded lawn which is notorious as one of the most difficult types of lawns to edge.

These and other objectives of the invention will become more readily apparent from the following detailed description taken in conjunction with the accompanying drawings in which:

Fig. 1 is a perspective view showing the application of the edger.

Fig. 2 is a front elevational view of the edger blade.

Fig. 3 is a rear elevational view of the edger blade.

Fig. 4 is a top plan view of the edger blade.

Fig. 5 is a cross-sectional view taken along line 5—5 of Fig. 2.

Figure 6:
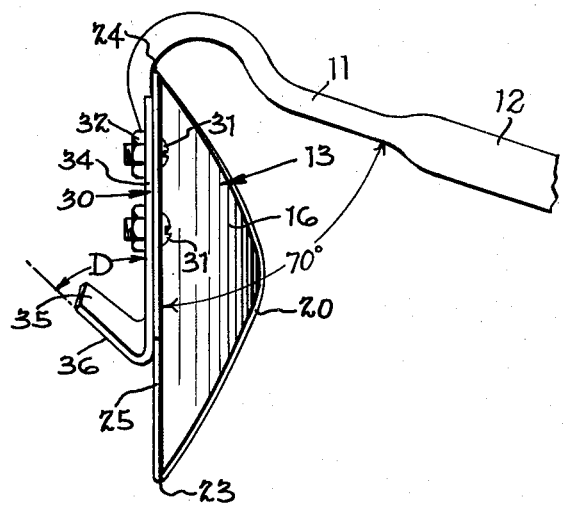
Fig. 6 is a side elevational view taken in the direction of the arrows 6—6 of Fig. 3.
Figure 7:
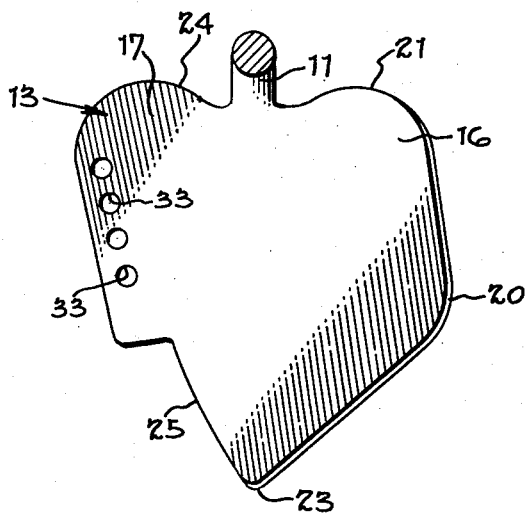
Fig. 7 is a developed plan view of the edger blade.

The principal elements of the edger are the pull handle 10, a shank 11 having a socket 12 to receive the handle and a generally triangular shaped edger blade 13 depending from the edge of the shank. The manner of securing the blade 13 to shank 11 may be by bolting, although it is preferred to join the blade to the shank integrally as by welding. The general manner in which the edger is applied to a walkway 14 to edge a lawn 15 is illustrated in Fig. 1 and is described with greater particularity below.

The lawn edger blade 13 may be considered to be of two parts, namely, a cutting portion 16 and a guide portion 17. The guide portion is connected to the handle 10 and forms an angle of approximately 70° therewith. As illustrated in the cross-sectional view of Fig. 5, the cutting portion 16 and guide portion 17 are integral, the cutting portion being an extension of the guide portion 17 and being at an angle of approximately 120° to the plane of the guide portion. While an angular relationship is specified, Fig. 5 demonstrates that the joint between the edge portion and guide portion is smoothly curvilinear.

The cutting portion may be considered to be generally triangular and to have a sharp cutting edge 20, an upper edge 21, the remaining edge of the triangle being an imaginary line 22 at which the cutting edge portion 16 joins the guide portion 17.

The guide portion also is of generally triangular or heart shape having an apex 23, a top edge 24 to which the shank 11 is integrally joined, and a guide edge 25, the remaining edge being formed by the imaginary line 22.

The imaginary line 22 forms an angle of approximately 20° with a line 27 extending from the shank 11 to the apex 23. The angles A and B are important particularly when related to the angle of engagement of the edger with the lawn as determined by a guide shoe to be described below. The angles A and B determine the angle of engagement of the cutting edge 20 with the lawn so that slicing through the turf at the optimum angle is effected. The proper relationship of angles A and B to the remaining edger structure avoids the tendency of the edger to pull or rip through the turf rather than slicing.

A guide shoe 30 is adjustably mounted on the guide portion 17 intermediate the ends of the guide portion edge 25 by means of a pair of screws 31 and nuts 32. The screws 31 pass through holes 29 in the guide shoe 30 and holes 33 in the guide portion. A plurality of holes 29 and 33 are provided and spaced equal distant so that the guide shoe may easily be rigidly fixed in any one of a number of vertical positions. The optimum position of the guide shoe with respect to the edger blade 13 will be determined by the vertical relationship of the walkway 14 to the lawn 15.

The guide shoe 30 is generally L shaped having a vertical leg 34 fixed to the guide portion 17 as described above and a horizontal leg 35, a lower surface 36 of which is engageable with a walkway or driveway at the edge of the lawn. By referring to Figs. 3 and 6, it can be seen that the surface 36 meets the vertical leg at a line indicated at 37. The line 37 is at an angle C of approximately 115° to the line 27 extending between the shank 11 and apex 23. The surface 36 also projects upwardly from the plane of the blade at an angle D of approximately 45°, whereby the lower surface of the guide shoe forms an angle of approximately 135° with the rear surface of the guide portion.

The angular relationship of the surface 36 as defined by the angles C and D is important for, if the user of the edger rests the surface 36 substantially flat on the sidewalk, the cutting edge 20 and the angle of engagement of the apex 23 of the cutting blade 13 will be at their optimum angles with respect to the lawn to be edged. The angle C causes a slight rotation (approximately 25°) of the blade 13 about the handle axis to bring the blade apex 23 close to the vertical edge of the walkway. The angle D determines that the handle should be held at the vertical position which will give the blade about a 45° angle of attack. When disposed at the optimum angle, the blade 13 slices through the soil, root structure and grass with very little effort.

The operation of the edger of the present invention is easily perceived. The user rests the surface 36 of the guide shoe 30 on the walk edge with the guide surface 36 lying substantially flat on the walk edge. In practice when the lawn is high, that is, in such a condition that edging is needed, the guide shoe will be put into engagement with the walk by pulling the edger toward the user and bearing down slightly to force the apex 23 of the blade 13 into the ground. By keeping an eye on the position of the guide shoe surface 36 with respect to the walkway, and by maintaining the handle 10 substantially in line with the walkway edge, the user will be assured that the angular relationships of the blade and its cutting edge are proper for maximum efficiency of cutting. The angle is such that the guide portion edge 25 is, except for the point of engagement of the corner of the walkway with the edge 25, spaced slightly away from the vertical edge of the walk, the corner of the walk being received by the corner formed between guide 30 and edge 25.

If the edger is pulled toward the user, the cutting edge 20 slices through the turf at an angle designed to ease the passage of the blade through the lawn. The curvature of the blade 13 causes movement of the cut turf away from the cutting edge and out over the top of the blade to form a furrow of leavings which can easily be raked up and be removed. Because of the angular relationships of the blade portions, there is a constant flow of cut turf away from the cutting edge toward the guide portion 17 and up over the top of the blade as shown in Fig. 1 and as indicated by arrows in Fig. 2, thus avoiding the piling up of the turf which makes more difficult the passage of the blade through the lawn and obscures the edge of the walk so that the user cannot accurately determine how to proceed.

A lawn edger with the invention in the manner described above, will require only a minimum of attention, that is, re-edging about twice a year in order to keep ahead of the lawn's normal tendency to encroach on the area of the walkway and drive.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described my invention, I claim:

1. A lawn edger comprising a pull handle, a shank fixed to the rearward end of said handle, a downwardly and forwardly directed blade fixed to said shank, said blade having a guide portion the plane of which is disposed at approximately 70° to the axis of said handle and a forwardly directed cutting portion forming an angle of approximately 120° with said guide portion, said cutting portion having a cutting edge extending upwardly from the lower extremity of said blade and a guide shoe mounted at the edge of said guide portion on the rear surface thereof, said guide shoe having a rearwardly extending projection having a lower surface forming an angle of approximately 135° with the rear surface of said guide portion.

2. A lawn edger comprising a pull handle, a shank fixed to the rearward end of said handle, a downwardly and forwardly directed blade of generally triangular shape fixed to said shank and tapering downwardly to a point at its lower extremity, said blade having a guide portion the plane of which is disposed at approximately 70° to the axis of said handle and a forwardly directed cutting portion forming an angle of approximately 120° with said guide portion, said cutting portion having a cutting edge extending upwardly from the lower extremity of said blade, and a guide shoe adjustably mounted at the edge of said guide portion on the rear surface thereof, said guide shoe having a rearwardly extending projection having a lower surface forming an angle of approximately 135° with the rear surface of said guide portion.

3. A lawn edger comprising a pull handle, a shank fixed to the rearward end of said handle, a downwardly and forwardly directed blade of generally triangular shape fixed to said handle, said blade having a guide portion the plane of which is disposed at approximately 70° to the axis of said handle and a forwardly directed cutting portion forming an angle of approximately 120° with said guide portion, said cutting portion having a cutting edge extending upwardly from the lower extremity of said blade, and a guide shoe mounted at the edge of said guide portion on the rear surface thereof, said guide shoe having a rearwardly extending projection having a lower surface forming an angle of approximately 135° with the rear surface of said guide portion.

References Cited in the file of this patent

UNITED STATES PATENTS

| | | |
|---|---|---|
| 1,179,178 | Hall | Apr. 11, 1916 |
| 2,263,491 | Glowe | Nov. 18, 1941 |